United States Patent
May (10) Patent No.: US 9,386,501 B2
(45) Date of Patent: Jul. 5, 2016

(54) SYSTEMS AND METHODS FOR IMPLEMENTING CUSTOMIZED ROUTING IN A MODULARIZED PROCESSING ENVIRONMENT

(71) Applicant: Dialogic Corporation, Montreal (CA)

(72) Inventor: Howard J. May, Southampton (GB)

(73) Assignee: Dialogic Corporation, Montreal (CA)

( * ) Notice: Subject to any disclaimer, the term of this patent is extended or adjusted under 35 U.S.C. 154(b) by 692 days.

(21) Appl. No.: 13/662,010

(22) Filed: Oct. 26, 2012

(65) Prior Publication Data

US 2014/0120865 A1    May 1, 2014

(51) Int. Cl.
*H04W 40/00* (2009.01)
*H04L 12/725* (2013.01)
*H04L 12/781* (2013.01)

(52) U.S. Cl.
CPC ............. *H04W 40/00* (2013.01); *H04L 45/306* (2013.01); *H04L 45/52* (2013.01)

(58) Field of Classification Search
CPC .............................. H04L 45/566; H04L 45/02
USPC .................................................. 455/428, 418
See application file for complete search history.

(56) References Cited

U.S. PATENT DOCUMENTS

| 7,315,541 B1* | 1/2008 | Housel | H04L 29/12481 370/392 |
|---|---|---|---|
| 2002/0062283 A1* | 5/2002 | Takahashi | G06Q 20/10 705/42 |
| 2002/0198974 A1* | 12/2002 | Shafer | G06Q 30/0277 709/223 |
| 2009/0327459 A1* | 12/2009 | Yoo | H04L 45/00 709/221 |
| 2010/0299451 A1* | 11/2010 | Yigang | H04L 45/306 709/241 |

OTHER PUBLICATIONS

P. Calhoun, et al., Diameter Base Protocal, IETF RFC 3588, Sep. 2003, pp. 1-148.

* cited by examiner

*Primary Examiner* — George Eng
*Assistant Examiner* — Joseph Dean, Jr.
(74) *Attorney, Agent, or Firm* — Chapin IP Law, LLC (57) ABSTRACT

A facility for customizable routing in a modularized routing environment is provided, where the complexities of routing functionality are not exposed to an application program. An identifier associated with a routing policy of an application program is used to configure a route table and to obtain routing instructions from the route table that are associated with the identifier. Routing is performed according to a message routing protocol, such as the Diameter protocol, for example. An interface between the facility and the application program may be implemented with an API that provides a relatively simple interface.

22 Claims, 5 Drawing Sheets

| Routing table entry configuration request | | 302 |
|---|---|---|
| Message Header | | |
| Field Name | Value | 312 |
| Route_id | Route identifier | 310 |
| Policy_id | Policy identifier | |
| Dest_host | Not used | |
| Dest_realm | Not used | |

| Routing table route list configuration request | | 402 |
|---|---|---|
| Message Header | | |
| Field Name | Value | 404 |
| Route_id | Route identifier | 406 |
| Route_list_id | Route list identifier | 408 |
| Peer_id | Peer identifier | |

| Route table | | | | | |
|---|---|---|---|---|---|
| Route selection criteria input | | | | | Output |
| Route_id | Dest_host | Dest_realm | Application_ref | Policy_id | Peer_id |
| Route identifier | Destination host | Destination realm | Application identifier | Policy identifier | Peer identifier |

| Routing request | | 602 |
|---|---|---|
| Message Header | | |
| Field Name | Value | 604 |
| Dest_host | Destination host | 606 |
| Dest_realm | Destination realm | 610 |
| Policy_id | Policy identifier | |

SYSTEMS AND METHODS FOR IMPLEMENTING CUSTOMIZED ROUTING IN A MODULARIZED PROCESSING ENVIRONMENT

CROSS REFERENCE TO RELATED APPLICATION(S)

(Not Applicable)

STATEMENT REGARDING FEDERALLY SPONSORED RESEARCH OR DEVELOPMENT (Not Applicable)

BACKGROUND

The present disclosure relates generally to systems and methods for implementing customized routing in a network using a modularized processing environment, and relates more particularly to providing a facility for selecting specific routes for routing messages in a network while avoiding exposing the complexities of message routing processing to an application program.

Processing communications in a telecommunication network sometimes involves the routing of communication messages, where the messages are sent on a specified path through the network. As used herein, a "message" refers to any type of communication that uses a telecommunication network for transport, and may include communications related to video, voice, text or other data transmission communications. For example, call signaling messages are routed through a telecommunication network to set up, manage and tear down a call. When a call is made, a call session is typically initiated, for which zero or more call signaling messages can be generated. The call signaling messages are routed to components in the communication network to manage the call during the call session.

Typically, messages are routed in a network in accordance with various protocols. For example, a call signaling-oriented protocol such as SS7 or SIP may be used to process call signaling messages. Other message handling protocols may be used for purposes such as to implement authentication of users of the telecommunication network, to authorize use of particular telecommunication network services and/or to convey accounting information related to the authorized user. One such protocol for handling such messages, including routing those messages through a network, is the Diameter protocol, which can be used within telecommunication networks that offer universal mobile telecommunications system (UMTS) and long-term evolution (LTE) services.

The Diameter protocol contributes to determining how to route messages related to authentication, authorization and accounting, which determination(s) may be made, at least in part, based on Diameter protocol specified parameters of destination-host, destination-realm and/or application ID, which parameters are defined by the Diameter protocol specification in IETF RFC 3588 (2003). The destination-host, destination-realm and application ID parameters are contained within the Diameter protocol message that is to be routed, as may occur during a call session, for example. An implementation of the Diameter protocol specification includes rules and procedures for routing based on the above-noted Diameter protocol parameters. It should be appreciated that Diameter protocol messages may be generated and routed through the network, in the absence of a call or call session, such as when a subscriber activates (turns on) a mobile phone in a mobile service cell area to establish a presence in the cell area. The Diameter protocol defines a precedence for evaluating the above-noted parameters to select a route in the order of (1) destination-host, (2) both destination-host and application ID and (3) destination-realm.

Messages originated by users, or clients, are typically routed to servers, which may be for example, signaling servers, that process the messages such as by providing responses or routing services. The routing of the messages, including those based on the Diameter protocol, may be implemented using various agents. The agents may be configured to implement security policies between administrative domains, avoid exposure of network architecture, consolidate routing configurations, implement routing policies and/or resolve interoperability issues. Some agents are defined explicitly for the Diameter protocol, including relay, proxy, redirect and translation agents. One or more of these agents may perform any, some or all of the operations of: receiving a message, analyzing a message, modifying a message and/or routing the message to an indicated destination.

The implementation and operation of the agents can be somewhat complex. For example, the routing function performed by an agent can be influenced by such factors as peer availability, advertized capabilities of a network node, flow control mechanisms, signaling network management state and load sharing. Because implementation of routing functionality is typically a complex undertaking, due at least in part to some of the above-mentioned factors, development of such an implementation is often time consuming, uses extensive development resources and is technically challenging. Due to some of these difficulties, entities that seek to provide network equipment that implement routing face significant challenges in developing and implementing routing functionality in the network equipment.

The challenges of implementing routing functionality in network equipment have resulted in some equipment builders looking to third parties to develop and package routing functionality in a modularized component. The equipment builders can then incorporate such a routing functionality component in the equipment, often with other modularized components, which can reduce the complexity of the overall equipment implementation. The operator of the equipment (which may be a builder), referred to herein as a user, may then access the routing functionality component with an application program via an interface that is intended to be simplified to promote interoperability between the routing functionality component and other components in the telecommunication equipment. The user of the telecommunication equipment thus does not typically deal with the complexities of implementing routing functionality, but rather leaves that task to the third party provider of the routing functionality component.

The equipment builder, user and third party provider can all stand to benefit from the modularization of the telecommunication equipment. The complexity and cost of building the equipment is reduced for the builder by taking a modular approach. The user can coordinate operations among modules more easily with improved organization that tends to make proper maintenance of the equipment easier to achieve. The third party provider can typically take advantage of economies of scale by providing the routing functionality component to numerous telecommunication equipment builders, so that the significant development costs associated with the routing functionality component can be spread among the builders or users. The routing functionality component typically incorporates routing protocols, including the Diameter protocol, and typically implements the complex routing functionality desired by the telecommunication equipment builder. The routing functionality component may expose a simplified interface to permit the user to easily access and utilize the complex routing functionality.

In some instances, a telecommunication equipment builder or a user might seek to provide proprietary or custom routing operations based on proprietary or custom routing parameters, policies or logic, for example. These proprietary or custom routing operations are sometimes implemented with the intent of optimizing network operations, supporting a value added service, enforcing one or more security policies, or for other reasons that may be specific to the telecommunication equipment builder or user. However, equipment builders and users are often limited in the proprietary or custom routing operations that can be performed through the simplified interface with the third party routing functionality component.

As a result, telecommunication equipment builders may undertake to implement such proprietary or custom routing in conjunction with implementing the routing functionality themselves, with all the attendant complexity and development challenges, such as some or all of those discussed above. In such cases, the telecommunication equipment builder will usually lose the advantages of utilizing a third party routing functionality component with a simplified interface, and will typically be forced to absorb the significant development costs associated with customizing the routing operations in conjunction with implementing the complex routing functionality. In such an instance, the telecommunication equipment builder would essentially develop a customized routing functionality component that is similar in many ways to the routing functionality component with the simplified interface offered by the third party, while expending significant resources for development costs.

SUMMARY

The presently disclosed systems and methods provide a facility for customizable routing in a modularized routing environment where the complexities of routing functionality are at least partially opaque or inaccessible to a user application. According to an aspect, the disclosed systems and methods provide a routing engine that implements a protocol for routing messages in a telecommunication network. The routing engine is encapsulated so that the inner workings of the protocol are largely opaque or inaccessible to the user application to avoid over-complicating routing control from the viewpoint of the user application. An interface to the routing engine is accessible to the user application to permit the user application to provide instructions and data to the routing engine to implement routing requests. For example, the user application can provide instructions to the routing engine via the interface to configure a route table with an entry in accordance with a user application policy implementation. The user application can also submit routing requests to the routing engine via the interface to obtain routing for a message in relation to a corresponding route entry configured in the route table.

According to another aspect, one or more route tables can be configured with an entry that includes an identifier that relates to an implementation of a routing policy of the user application. With the route table(s) so configured, the user application can provide a routing request that includes and/or references the identifier. The reference and/or identifier may then be used to select a particular entry in a route table to contribute to determining a specific route and/or routing instructions to be used for routing the message in accordance with the user application policy. The route determined in conjunction with the selected route table entry is used for routing the message through the network. The facility of providing an identifier in the route table(s) for a user application policy implementation beneficially permits the user application to implement customized route selection without requiring the user application to implement complex routing functionality.

According to an aspect of the present disclosure, an application programming interface (API) is provided to implement the interface between the user application and the routing engine. The API exposes access to message routing functionality for the user application, which can submit routing requests to the routing engine via the API. For example, the API provides a facility for receiving routing configuration requests from the user application, in which one or more route table entries can be added, modified or deleted. One or more route tables can be configured with one or more entries to include an identifier or reference that permits a particular route to be selected in accordance with a desired user application policy implementation.

According to another aspect, the API exposes a facility to the user application to accept routing requests that include the identifier and/or a reference to the identifier. The interface exposed by the API accepts message routing parameters, as well as the identifier and/or reference that is used to specify a particular route selection in accordance with policies implemented by the user application. The routing engine looks up a route table entry based on the message routing parameters as well as the identifier and/or reference, and implements the desired routing functionality in accordance with the complexities of message routing protocols without exposing the inner workings of the message routing operations to the user application. Accordingly, the API permits the user application to specify particular routes for messages using the identifier and/or reference, without the user application becoming involved in the intricacies of routing operations.

According to another aspect, the user application is able to specify a particular route for routing a message, where there otherwise may be several acceptable routes for routing the message. For example, one or more route tables in the routing engine may include one or more entries that provide proper routing for a given message, where the first route table entry that matches the message parameters is chosen for determining how the message will be routed. In such an instance, the path taken by the message in the network can vary, depending upon, for example, such factors as which route and/or route table entry is first located in a route selection search, the status of one or more network nodes, which nodes may be nonfunctional, unable to supply desired processing, overloaded or unavailable for processing a message. In accordance with this aspect of the present disclosure, a particular route can be specified to determine a path in the network with particularity based on a route table and/or route table entry that corresponds to a routing policy identifier and/or reference provided to the routing engine by the user application.

BRIEF DESCRIPTION OF THE SEVERAL VIEWS OF THE DRAWINGS

The present disclosure is described in greater detail below, with reference to the accompanying drawings, in which.

DETAILED DESCRIPTION OF THE INVENTION

The present disclosure provides systems and methods for routing a message through a telecommunications network according to a customized routing specification. The customized routing specification is employed to designate a route for routing the message without exposing the complexities of routing operations to the user application that requests the routing operation. The designated route permits selection of a particular path for routing the message through the network, where several possible paths might be available for routing the message.

Figure 1:
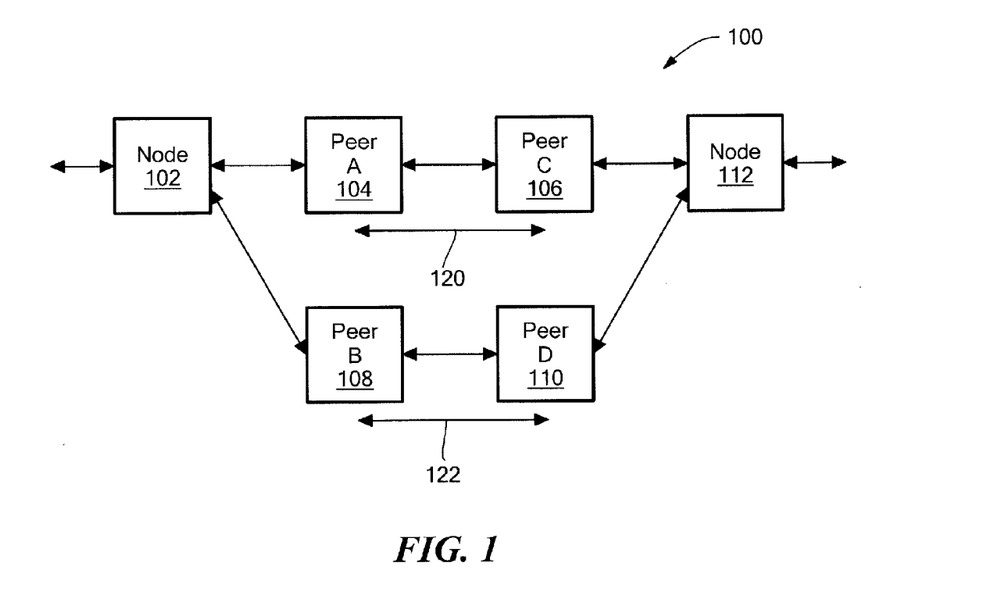
FIG. 1 is a block diagram of an exemplary embodiment of the present disclosure showing alternate pathways between interconnected network nodes.

Referring now to FIG. 1, a block diagram of different pathways between interconnected nodes in a telecommunication network 100 is illustrated. Network 100 represents a portion of a larger telecommunication network, such as, for example, a packet switched internet protocol (IP) network, for illustrative purposes. Network 100 consists of nodes that are interconnected to permit messages to be sent and/or received among the various nodes. As shown in the FIG. 1 exemplary embodiment, there are six nodes (102, 104, 106, 108, 110 and 112); however, it is noted that the number of nodes can be greater or less than six while still remaining in accordance with the scope of the present disclosure and its teachings.

Some of nodes 102, 104, 106, 108, 110 and/or 112 may be implemented, for example, as network devices, which network devices may include gateways, routers, network bridges, switches, hubs, repeaters, as well as other network devices that may be interconnected to pass messages to other network devices to which they are connected. For example, node 102 may be implemented as a home subscriber server (HSS) that processes communication data including by routing messages to peer nodes in network 100. Node 104, designated as peer A, and node 108, designated as peer B, are illustrated as peers of node 102 in this example. Accordingly, node 102 can route messages through node 104 or through node 108 depending upon an ultimate destination of the message and the routing configuration of node 102.

Network 100 includes a first pathway 120, which is illustrated with an arrow as connecting node 102 to node 112 through node 104 and node 106. A second pathway 122 in network 100 is illustrated with an arrow as connecting node 102 to node 112 via node 108 and node 110. Node 106 and node 110 are peers of node 112 and are respectively designated as Peer C and Peer D. Each of nodes 102, 104, 106, 108, 110, 112 is generally configured to have one or more route tables (not shown) that specify how incoming messages to each of nodes are to be routed in network 100. A route table is a construct typically implemented in memory of a telecommunication network node that provides information on how messages should be routed from the node.

Figure 1A:
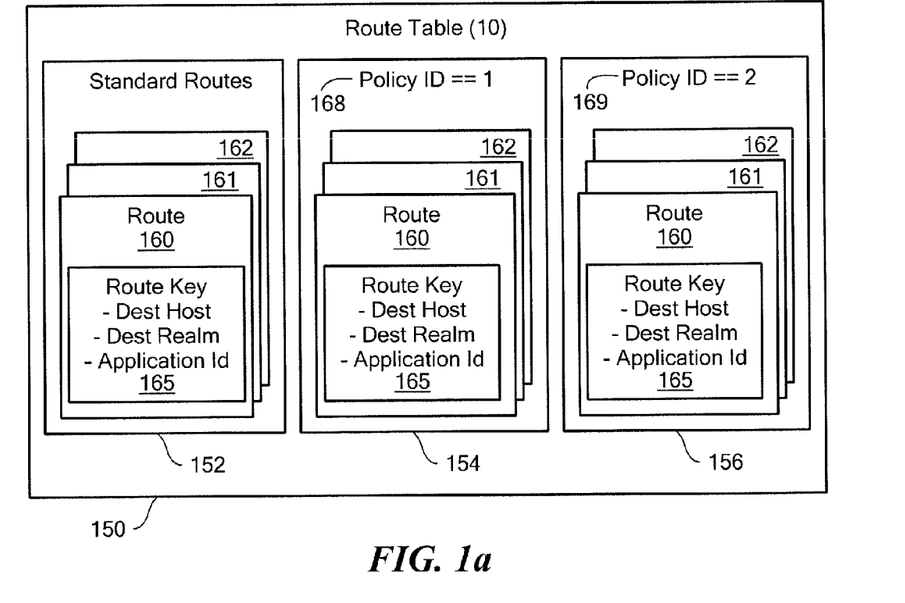
FIG. 1a is a block diagram illustrating a route table in accordance with an exemplary embodiment of the present disclosure.

Referring to FIG. 1a, a route table 150 is illustrated as having three groupings of route entries organized as tables 152, 154 and 156. It is it is noted that the number of groupings can be greater or less than three while still remaining in accordance with the scope of the present disclosure and its teachings Tables 152, 154 and 156 may be implemented as logical tables, which is an organization in memory of the table data that permits access to the table data as if the information were actually stored in a table type format, whether that is actually the case or not. For example, route table 150 may be physically or logically organized as a linked list to implement tables 152, 154 and 156. A linked list is a memory storage construct that is known in the relevant art for storing and referencing information in discrete groups. It should be appreciated by one of ordinary skill in the art that a route table, such as route table 150, can be implemented to have a single table construct with zero or more entries. Entries in the route table (such as route table 150) can be indexed based on one or more keys that each represent groups of route entries that can be searched to locate a particular route entry. In addition, the logical or physical structure of a route table (such as route table 150) can be as a linked list, as discussed above, a tree structure, or any other type of construct that provides consistent results for a search conducted on the structure to locate a route entry.

In the exemplary embodiment illustrated in FIG. 1a, table 152 is implemented as a group of routes that provide standard routing instructions based on routing protocol parameters, for example. Tables 152, 154 and 156 are each illustrated as including route entries, each of which can specify values for one or more of the Diameter protocol parameters destination-host, destination-realm and/or application ID. FIG. 1a shows three route entries (160, 161 and 162) for each of tables 152, 154 and 156, however the number of route entries can be greater or less than three while still remaining in accordance with the scope of the present disclosure and its teachings. Each of route entries 161, 162 and 163 can be referenced by one or more key fields that may be implemented as one or more of the Diameter protocol parameters mentioned above. For example, route entry 160 in table 152 may include values for one or more of the Diameter protocol parameters destination-host, destination-realm and/or application ID, which values are used as keys to locate route entry 160 in table 152.

In some circumstances, such as when the search criteria does not include a routing policy identifier, a search of route table 150 is directed to table 152 to locate standard routes based on the content of key fields 165. Such a search typically matches the values contained in one or more of key fields 165 with the corresponding values provided in the search criteria. It may be the case that route entries 160, 161 and 162 in table 152 all provide appropriate or proper routing instructions for routing a given message. However, route entry 160 may be selected prior to route entry 161 or 162 if, for example, route entry 160 is the first route entry encountered in the search that matches the route search criteria. Accordingly, while each of route entries 160, 161 and 162 may provide appropriate and proper routing instructions for routing a given message, route entry 160, being located first in accordance with the search criteria, would be selected to provide the routing instructions for routing the message.

Referring again now to FIG. 1, if route table 150 is implemented in node 102, for example, route entry 160 may correspond to peer connections leading to pathway 122 in network 100. For example, route entry 160 may identify a peer connection for Peer B (node 108). In such an instance, selection of route entry 160 provides routing instructions for routing the message to Peer B (node 108). Furthermore, route entry 161 may represent a route for forwarding the message from node 102 to node 104 along pathway 120. In that instance, route entry 161 identifies a peer connection for Peer A (node 104). Selection of route entry 161 in this case provides routing instructions for routing the message to Peer A (node 104). However, due to the selection of route entry 160 prior to the selection of route entry 161 based on the content of key fields 165, routing instructions for routing the message from node 102 to the peer connection for Peer B (node 108) would be retrieved.

Other factors may also influence the selection of a route entry in table 152 to obtain routing instructions for a given message, which factors may include, for example, network status, peer availability, advertised capabilities of peers, flow control mechanisms and/or load sharing determinations. In any event, when a routing policy identifier is not specified in a routing request, the resulting route selection is limited to the route entry, such as route entry 160, selected according to the content of key fields 165, conditioned by factors related to network operations.

In accordance with an exemplary embodiment of the present disclosure, route table 150 shows tables 154 and 156 that are referenced, respectively, in accordance with the value of routing policy identifier fields 168 and 169. Routing policy identifier fields 168 and 169 correspond to policy IDs that are associated with particular routing policy implementations specified by the user for routing messages out of a node, such as node 102 (FIG. 1), for example. Tables 154 and 156 are organized according to a similar construct as table 152 in which route entries 160, 161 and 162 are provided and referenced based on the content of key fields 165. It should be understood by one of ordinary skill in the art that route entries in each of tables 152, 154 and 156 may each include unique values for routing protocol parameters, such as destination-host, destination-realm and/or application ID, where selection of a particular one of route entries 160, 161 or 162 can be made on the basis of key fields 165.

In accordance with an exemplary embodiment of the present disclosure, the value of a routing policy identifier employed in a search criteria is used to reference a specific one of tables 152, 154 and 156. For example, no specified routing policy identifier in the search criteria can be used to reference table 152, whereas a routing policy identifier value that matches that in routing policy identifier fields 168 or 169 can be used to respectively reference table 154 or table 156. Routing policy identifier fields 168 and 169 can be viewed as an additional key field that can be used to locate particular groups of routes in route table 150. It should be understood by one of ordinary skill in the art that any number of route tables, such as route table 150, can be implemented in a given network node, and any number of table or other constructs, such as tables 152, 154 and 156, can be implemented in a route table such as route table 150. Moreover, a route table such as route table 150 can be implemented to have alternate or additional constructs other than tables, such as linked lists, trees or other logical or physical organizations of data that can be realized in a memory. The use of route table 150 in the process of route selection is discussed further below.

Figure 2A:
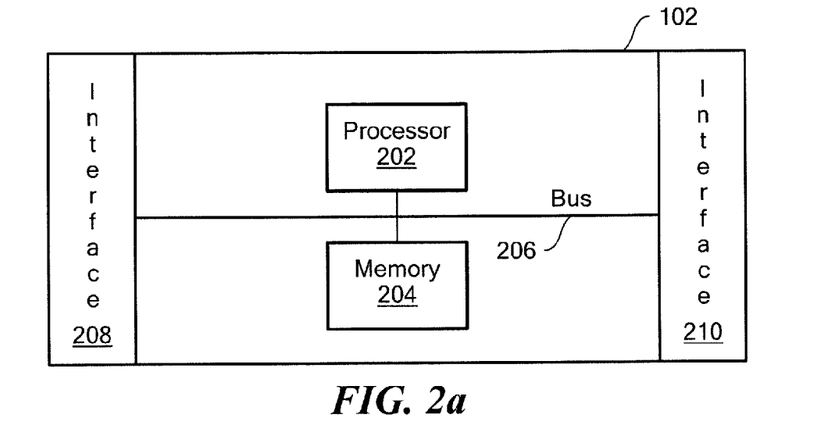
FIGS. 2a and 2b are block diagrams illustrating internal components of a network node in accordance with exemplary embodiments of the present disclosure.

Referring to FIG. 2a, a block diagram of node 102 according to an exemplary embodiment of the present disclosure is illustrated as having internal components, one or more of which may be implemented with one or more hardware components, for example. Node 102 may be implemented as an HSS, as mentioned above, and includes a processor 202, a memory 204, a bus 206, an incoming interface 208 and an outgoing interface 210. Processor 202 executes instructions out of memory 204 to implement constructs such as a route table (not shown) to direct a message received on interface 208 to an appropriate output channel (not shown) in interface 210. Routing a message to a particular output channel in interface 210 causes the message to be directed to a peer network device, such as peer A or peer B in respective node 104 or node 108 (FIG. 1). Route table 150 (illustrated in FIG. 1a) can be implemented in memory 204 of node 102, and accessed and manipulated by processor 202.

Figure 2B:
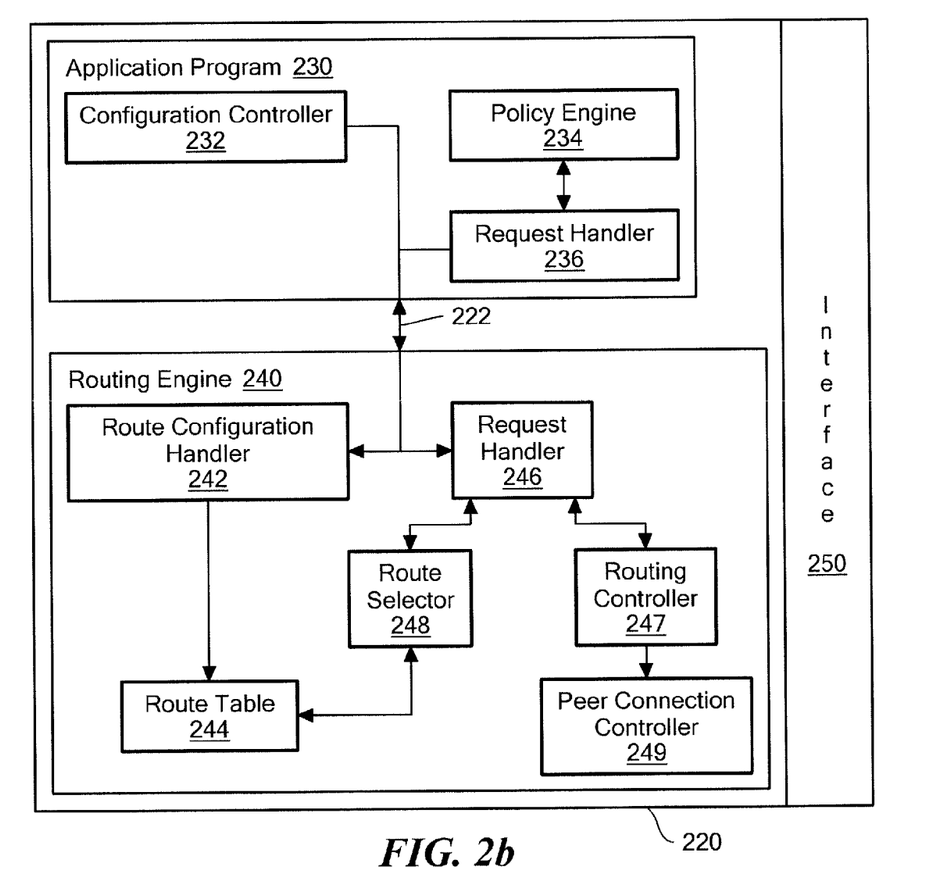

Referring now to FIG. 2b, a block diagram illustrates an architecture 220 of internal components of node 102 (FIGS. 1, 2a) according to an exemplary embodiment of the present disclosure, which internal components may be implemented in hardware or software, for example. Architecture 220 may be implemented in node 102 with processor 202 executing instructions from memory 204 to implement the various internal components of architecture 220.

Architecture 220 is illustrated in this exemplary embodiment of the present disclosure as having two major components that implement routing operations, namely an application program 230 and a routing engine 240. Application program 230 is typically, but not necessarily, created and configured by a user to implement the users desired policies and behaviors for node 102. Routing engine 240 is typically, but not necessarily, created and configured by a third party and provided to the user as a stand alone component that can be incorporated into architecture 220 using an interface 222. Routing engine 240 provides routing functionality for network node 102, for example, under the direction of application program 230.

Application program 230 communicates with routing engine 240 using interface 222 that links the two components together to permit exchanges of information to implement routing operations. According to an exemplary embodiment of the present disclosure, interface 222 may be implemented as an application programming interface (API) that provides structured access between application program 230 and routing engine 240. Typically, but not necessarily, application program 230 provides instructions to routing engine 240 through interface 222 for configuration of routing operations, in addition to providing runtime routing requests to indicate how messages should be routed. Application program 230 includes a configuration controller 232 that is responsible for providing routing configuration instructions and data to routing engine 240 through interface 222. Configuration controller 232 is a processing component that can create configuration instructions and data for configuring routes in routing engine 240 that will determine how messages received by application program 230 will be processed for routing. Configuration controller 232 is implemented to set specific routes or lists of routes in routing engine 240 in accordance with desired configuration parameters established for application program 230. For example, configuration controller 232 can format requests that are used to instruct routing engine 240 to configure routes for routing messages, where the information in the formatted requests is derived from desired policies to be implemented by application program 230.

Routing engine 240 includes a route configuration handler 242 that receives the instructions and data from configuration controller 232 via interface 222 for configuration of a route table 244. Route table 244 may be implemented as route table 150 (illustrated in FIG. 1a), or as route table 520 (illustrated in FIG. 5a). Accordingly, route table 244 may be organized to have entries grouped into different categories that may be referenced by standard routes or a routing policy identifier, such as is illustrated with route table 150 and FIG. 1a.

Configuration handler 242 can access route table 244 and use the instructions received from configuration controller 232 to modify route table 244 in accordance with the instructions, such as by adding (instantiating) an entry to route table 244, modifying an entry, or deleting an entry. The instructions provided to route configuration handler 242 may be applicable to configuration of a list of routes in a given construct of route table 244, such as one of tables 152, 154 or 156 or may be applicable to configuration of one or more individual routes that can be implemented in route table 244.

Route table 244 may be implemented and organized in accordance with route table 150 (illustrated in FIG. 1a), where route entries are logically or physically grouped together according to a given category, for example. Table 150 illustrates route entries that are grouped according to routing policy identifiers, as may be provided by routing policy identifier fields 168 or 169 or the absence thereof. In addition, or alternatively, route table 244 may be organized as a single table data structure that holds zero or more routes. A route provided in route table 244 is referenced in accordance with one or more key fields. In accordance with an exemplary embodiment of the present disclosure, the key fields that may be used to reference a route entry in the single table data structure may include a routing policy identifier, a destination-realm, a destination-host and/or an application ID. Any one, some or all of such key fields may be used to reference a given route entry for selection of desired route.

Once a new route entry is instantiated, the applicable key fields of the new route entry are configured with values specified by route configuration handler 242. Any, some or all of the key fields may be configured with values, which may then be used to reference the route entry when a search is performed on route table 244. The new route entry with the configured key fields is then added to the collection of route entries in route table 244.

The way in which the new route entry is added to the collection of routes may depend upon the configuration of route table 244. For example, if route table 244 is configured in accordance with the arrangement of route table 150 illustrated in FIG. 1a, the new route entry may be added to one or more of tables 152, 154 or 156, or may be used to establish a new table construct. As an additional or alternative exemplary embodiment of the present disclosure, the new route table entry may be added to the collection of routes by being included in a linked list of route entries. For example, if route table 244 is configured as a single data structure, such as a linked list, the new route entry may be added at the end of the data structure. In such an instance, the new route entry would be referenced in a search of route table 244 in accordance with the values configured for the key fields provided in the new route entry.

Route table 244 can be configured via route configuration handler 242 upon initialization, or at any time during operation, in accordance with instructions provided from configuration controller 232 in application program 230, for example. Route table 244 can be used to locate desired routing instructions based on a search through route table 244 conducted on the basis of the values in the key fields, or other parameter values that can be implemented in one or more of the route entries in route table 244.

Application program 230 also includes a policy engine 234 and a request handler 236 that are communicatively connected together. Request handler 236 is a processing component that receives and processes messages, such as routing protocol messages that may be, for example, Diameter protocol messages. Request handler 236 is also communicatively connected to interface 222 to provide instructions and data to routing engine 240 to arrange for routing of the received message. Request handler 236 thus provides processing for messages that are received by network node 102 and managed by application program 230 to permit the messages to be forwarded to appropriate destinations. As part of the processing, request handler 236 submits requests to policy engine 234 to determine how messages should be processed according to policies that may be set in policy engine 234. More specifically, policy engine 234 provides a set of rules and policy implementations that can indicate how certain messages are to be processed, such as by providing information on how messages should be routed.

In operation, request handler 236 submits a request to policy engine 234 to determine how an incoming message should be handled. Request handler 236 may pass parameters to policy engine 234 that are related to the message, such as origination, destination, originator device identifier, and/or other call signaling related information that may, for example, contribute to a determination of routing instructions based on policy considerations. Policy engine 234 analyzes the message and/or passed parameters and provides request handler 236 with information for processing the received message. The information provided to request handler 236 may include an identifier that identifies a particular policy specified in policy engine 234, and/or may identify a particular route to be used for processing the message. The information returned from policy engine 234 permits request handler 236 to formulate a request to routing engine 240 via interface 222 to undertake routing operations for the message. The request may include the identifier provided by policy engine 234.

Routing engine 240 includes a request handler 246 that manages requests for routing operations received from application program 230. More specifically, request handler 246 receives requests from request handler 236 via interface 222 and processes the requests to provide routing instructions for routing the message. Request handler 246 is connected to a route selector 248, which provides route selection information to request handler 246 upon request. Route selector 248 is connected to route table 244 and can access and search route table 244 to obtain routing instructions that are determined by the information provided by request handler 246. Route selector 248 thus uses the information provided by request handler 246 to search route table 244 for a route entry that matches a criteria indicated by the information supplied to route selector 248 by request handler 246.

Route table 244 can include zero or more route entries, which operate as rules for routing a given message. Route entries in route table 244 are typically broken up into two different sections, such as an input section that is used to match routes with search criteria and an output section that provides routing instructions specific to the network node in which the route table is implemented, such as, for example, node 102. The input section may include key fields that have values that can be used to match search criteria to select a route. Route selector 248 provides the criteria to be matched against the input section of the entries of route table 244, and receives the routing instructions in the entry that matches the input criteria. The routing instructions retrieved by route selector 248 are provided to request handler 246.

In accordance with an exemplary embodiment of the present disclosure, request handler 246 provides the routing policy identifier received from request handler 230 to route selector 248. Route selector 248 uses the routing policy identifier to index through route table 244 to locate a specific matching entry. The entry in route table 244 that matches the routing policy identifier provided by route selector 248 is the entry that was previously configured with the routing policy identifier specified by configuration controller 232. Consequently, a specific entry in route table 244 associated with the routing policy identifier is retrieved by route selector 248 and provided to request handler 246 to provide specific routing instructions for the message being processed by routing engine 240.

It should be understood by one of ordinary skill in the art that the routing policy identifier used to index through route table 244 may be the routing policy identifier provided by policy engine 234 via request handler 236 and application program 230. The routing policy identifier can be used as a primary key in searching route table 244, so that a group of routes corresponding to the routing policy identifier may be selected for further searching operations by route selector 248. For example, if route table 244 is implemented as route table 150 illustrated in FIG. 1*a*, the routing policy identifier can be applied to match an associated routing key field in tables 152, 154 and 156. If, for example, the routing policy identifier matches value 168 of table 154, table 154 is further searched for an entry that matches the parameters in the search criteria, which parameters may include key field values, such as destination-host, destination-realm or application ID, in accordance with the Diameter protocol. If no routing policy identifier is specified in the routing request provided by request handler 236 in application program 230, table 152 in route table 150 may be selected for further searching operations to locate a route entry that matches the search criteria.

It should be understood by one of ordinary skill in the art that the routing policy identifier used by route selector 248 to select an entry in route table 244 may be the same as or different from the routing policy identifier provided by policy engine 234, or configuration controller 232. For example, the routing policy identifier used by route selector 248 may be provided as a reference that is specific to the entry in route table 244 that includes the routing policy identifier provided by configuration controller 232. Since application program 230 sets the route configuration of route table 244, application program 230 may provide a particular reference or routing specification to routing engine 240 that is known by application program 230 to cause the selection of a single entry in route table 244. For the sake of simplifying interface 222, the routing policy identifier used by configuration controller 232, policy engine 234, and the routing policy identifier provided in route table 244 may all be identical. By providing a single routing policy identifier that can be passed between application program 230 and routing engine 240, interface 222, which may be implemented as an API, can be simplified and can include a basic message structure.

Figure 5:
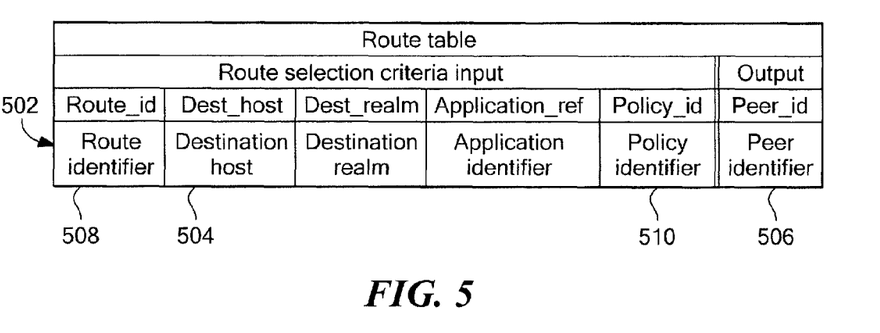
FIG. 5 is an illustration of portions of a route table entry in accordance with an exemplary embodiment of the present disclosure.
Figure 5A:
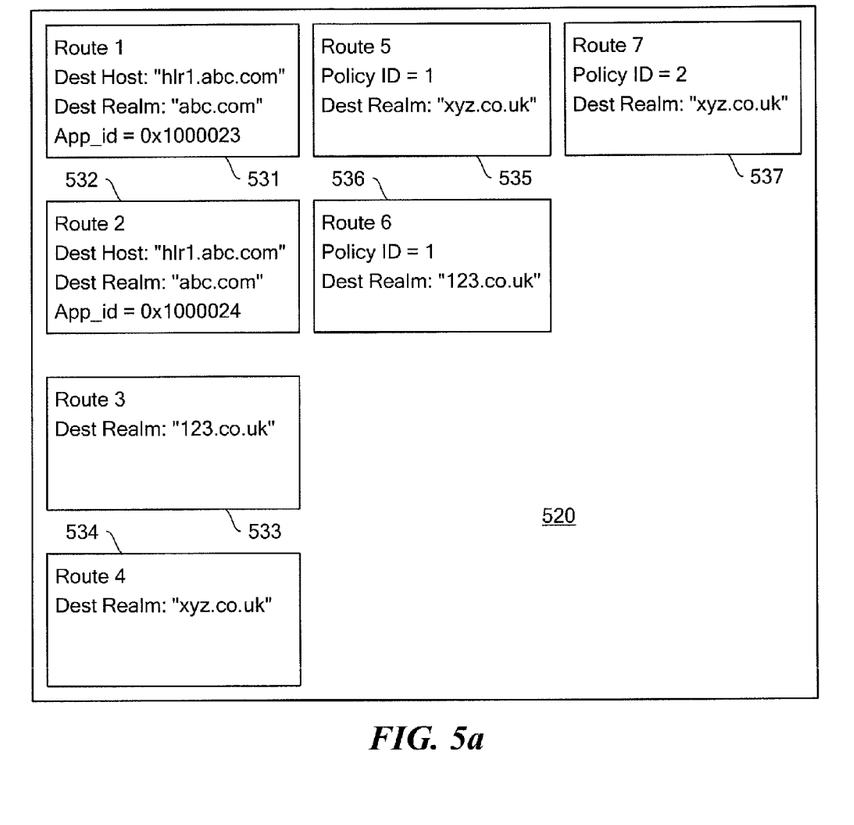
FIG. 5a is an illustration of a route table in accordance with an exemplary embodiment of the present disclosure.

Referring to FIG. 5*a*, a route table 520 is illustrated in accordance with an exemplary embodiment of the present disclosure. Route table 520 includes seven route entries, each of which is identified with a respective designator 531, 532, 533, 534, 535, 536, 537. It is noted that the number of designators can be greater or less than seven while still remaining in accordance with the scope of the present disclosure and its teachings. Route entries 531-537 represent different scenarios for how a given route entry may be selected based on the key fields of the routing policy identifier and Diameter protocol parameters destination-host (denoted as "Dest Host" in FIG. 5*a*), destination-realm (denoted as "Dest Realm" in FIG. 5*a*) and application ID (denoted as "App_id" in FIG. 5*a*). For example, route entry 531, labeled as "Route 1" is the only route entry in route table 520 that includes a value for the key field labeled as Dest Host to indicate the Diameter protocol destination-host parameter. Accordingly, a search performed on route table 520 with the search criteria of destination-host equal to "hlr1.abc.com" causes route entry 531 to be selected.

Route entry 533 and 536 each have a key field value of "123.co.uk" for the key field labeled destination-realm. Route entry 536 also includes the key field labeled as "Policy ID," which has a value of "1." Accordingly, a search performed on route table 520 with a destination-realm value of "123.co.uk" and with no value for the key field labeled "Policy ID," or a value—other than "1"—for the key field labeled "Policy ID" causes route entry 533 to be selected. A search performed on route table 520 with the parameters that include destination-realm with a value of "123.co.uk" and a value for the key field labeled "Policy ID" of "1" causes route entry 536 to be selected.

A search performed on route table 520 with destination-realm value of "xyz.co.uk" selects route entry 534 if no value for the key field labeled "Policy ID" is specified, or selects route entry 535 if the value for the key field labeled "Policy ID" is set to "1", and selects route entry 537 if the value for the key field labeled "Policy ID" is set to "2." In accordance with the exemplary embodiment of the present disclosure of a route table as illustrated with route table 520, different route entries (and thus routing instructions) can be selected in the route table based on varying routing policy identifier values, where specification of a routing protocol parameter value may lead to nonspecific route entries being selected for routing the message in the network. For example, in the absence of a value for the key field labeled "Policy ID" in any of route entries 531-537 of route table 520, specifying the destination-realm of "xyz.co.uk" as a search criterion for route table 520 would potentially permit any one of route entries 534, 535 or 537 to be selected for routing the associated message. The selected route entry in such an instance depends on which of route entries 534, 535 or 537 is first located in a search of route table 520. For example, if a search of route table 520 were to be conducted for entries with a destination-realm of "xyz.co.uk" and route entry 537 was the first to be located in such a search, that route entry 537 would be selected for determining routing instructions for the message. With the introduction of the key field for the Policy ID parameter, a specific route entry in route table 520 can be selected based on appropriate search criteria that includes a value for the routing policy identifier. Thus, a customized route can be selected based on the request provided by application program 230 in accordance with a routing policy identifier.

Request handler 246 is connected to a routing controller 247, which is responsible for determining how to implement the routing instructions in accordance with the configuration of network node 102. Request handler 246 provides routing controller 247 with the instructions and information obtained from the route entry in route table 244 that match the criteria related to the message that is to be routed. Routing controller 247 is connected to a peer connection controller 249, which is responsible for connection control for connections to peers of network node 102. Peer connection controller 249 is connected to an interface 250, which provides a structured transport mechanism for the message under control of peer connection controller 249, based on the control instructions received from routing controller 247. Interface 250 may have a single connection (not shown), or one or more different connections (not shown) to peer network nodes that can be used to transport messages. A connection on interface 250 that is chosen to transport a message determines the route that the message traverses from network node 102. Accordingly, route table 244 provides logical designations for routing messages, which are translated to physical connections for routing through processing by routing controller 247 and peer connection controller 249.

According to an example of an implementation of the disclosed systems and methods, user application 230 is configured to specify particular routing policies that can be implemented by routing engine 240. In this example, the user defines a routing policy for messages with a mobile subscriber integrated services digital network-number (MSISDN) in the range of 07740111111 to 07740222222. The routing policy calls for routing messages associated with an MSISDN that falls in this range from node 102 to peer A (node 104), and calls for routing all other messages from node 102 to peer B (node 108). In this example, the user can configure two routes, each being associated with a specific routing identifier, to provide customized routing for the desired routing policy implementation. The user thus configures application program 230 to form and submit a route table entry configuration request via configuration controller 232 to establish routes to implement the policy.

Figure 3:
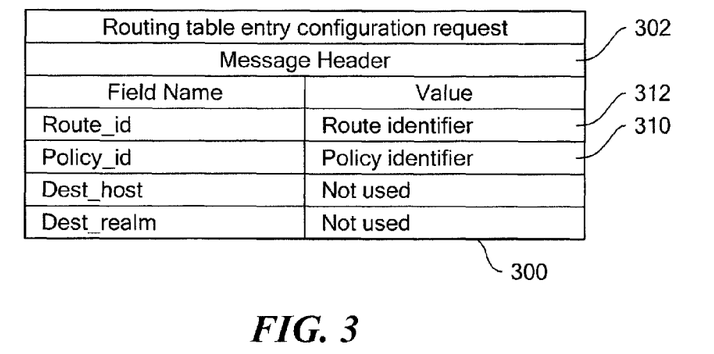
FIG. 3 is an illustration of a route table configuration request in accordance with an exemplary embodiment of the present disclosure.

Referring to FIG. 3, a route table entry configuration request 300 is illustrated in accordance with an exemplary embodiment of the present disclosure. Request 300 is employed to supply a desired entry in route table 244 (see FIG. 2b) to implement the policy according to the above example. Request 300 includes a message header 302 and various parameter fields that are used for setting up the desired entries in route table 244. Included in request 300 is a routing policy identifier 310 with a label of Policy_id and a value of "Policy identifier." Routing policy identifier 310 may be used to establish a key field, such as is discussed above with respect to FIG. 1a. Request 300 also includes a route entry identifier 312 with a label of Route_id and a value of "Route identifier." Route entry identifier 312 can identify a specific route in route table 244 that is to be configured. Configuration controller 232 illustrated in FIG. 2b formulates and forwards request 300 over interface 222 to route configuration handler 242 in routing engine 240. Route configuration handler 242 receives request 300 and prepares to update route table 244 with an entry that may include one or more parameters provided in request 300, including routing policy identifier 310.

Figure 4:
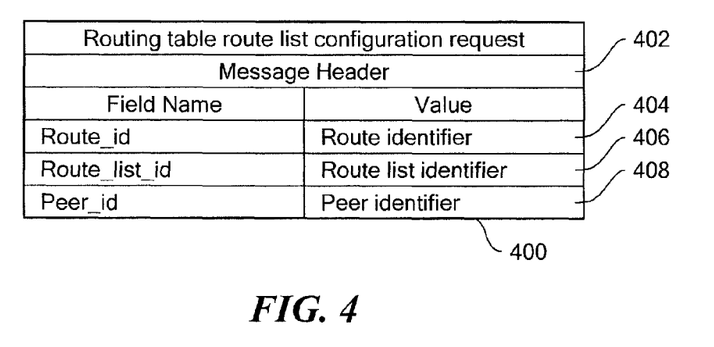
FIG. 4 is an illustration of a route table list configuration request in accordance with an exemplary embodiment of the present disclosure.

Referring now to FIG. 4, an exemplary embodiment of a route table route list configuration request 400 that is formed by configuration controls 232 is illustrated, which is intended to follow request 300. Request 400 includes a message header 402 and several parameter fields that are used for setting up the desired entries in route table 244. Request 400 includes a route entry identifier 404 with a label of Route_id, a route list identifier 406 with a label of Route_list_id and a peer identifier 408 with a label of Peer_id. Route list identifier 406 has a value of "Route list identifier" that identifies the particular route list that is to be configured in route table 244. Route entry identifier 404 has a value of "Route identifier," which matches that of request 300 (FIG. 3) to establish that request 400 is to be used to configure a route entry in route table 244 corresponding to the value "Route identifier" found in route entry identifier 312. Peer identifier 408 has a value of "Peer identifier," which presumes that the peer connection to peer A (node 104) was previously configured with a value of "Peer identifier" associated with the peer connection.

Request 400 is provided by configuration controller 232 via interface 222 to route configuration handler 242 in routing engine 240 to configure route table 244 with the specified route. FIG. 5 illustrates a portion of route table 244 that includes an entry 502 that results from route configuration handler 242 receiving and processing requests 300 and 400. Route entry 502 includes route entry identifier 508 labeled as Route_id with a value of "Route identifier" and routing policy identifier 510 labeled as Policy_id with a value of "Policy identifier" on an input side 504 of route table 244. Note that the value of route entry identifier 508 matches that of route entry identifier 312 (FIG. 3) and route entry identifier 404 (FIG. 4). Also, the value of routing policy identifier 510 matches that of routing policy identifier 310. An output side 506 of route entry 502 provides the selection of peer A (node 104), which has a peer identifier 506 labeled as Peer_id with a value of "Peer identifier," which matches the value of Peer identifier 408.

When a request is applied to route table 244 that includes routing policy identifier 510 with a value of "Policy identifier," route entry 502 is selected, which results in peer identifier 506 with a value of "Peer identifier" being returned to identify a connection to peer A (node 104) as the routing target for the message associated with the routing request. Accordingly, messages with the MSISDN in the above-specified range will be routed from node 102 to node 104 based on the content of route entry 502 provided in route table 244.

In operation, the routing selection process is initiated by receipt of a message by application program 230 that includes an MSISDN in the above-specified range. Request handler 236 receives the message and submits a request to policy engine 234 to determine how the message should be handled. Policy engine 234 is configured with the above-noted policy for routing messages with the MSISDN in the above-noted range, and thus provides a routing policy identifier associated with the policy, in addition to other routing related parameters, such as one or more of a destination-realm, destination-host and/or application ID. The value associated with the routing policy identifier is "Policy identifier," and is the value returned to request handler 236 to implement the desired routing policy in this example. Request handler 236 forms a routing request that includes the routing policy identifier value and forwards the routing request to routing engine 240 via interface 222.

Figure 6:
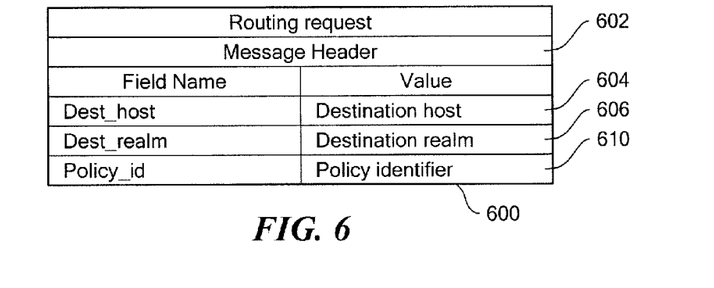
FIG. 6 is an illustration of a routing request in accordance with an exemplary embodiment of the present disclosure.

Referring to FIG. 6, a format of a routing request 600, as composed by request handler 236 (FIG. 2b), is illustrated. Request 600 includes a message header 602 and parameters 604, 606 and 608, which are respectively the destination-host, destination-realm and application ID that are defined for the message routing protocol employed by routing engine 240, such as may be implemented with the Diameter protocol. Parameter 610 is the routing policy identifier labeled as Policy_id with a value of "Policy identifier." Routing request 600 is received by request handler 246 in routing engine 240 (FIG. 2b) for routing processing.

Request handler 246 receives routing request 600 and submits a route selection request to route selector 248. Route selector 248 in turn performs a search on route table 244 to match the parameters of routing request 600 with entries in route table 244. Route selector 248 locates route entry 502 (FIG. 5) that includes routing policy identifier 510 with a label of Policy_id and a value of "Policy identifier," which matches routing policy identifier 610 of routing request 600. Upon determining that route entry 502 matches routing request 600, route selector 248 returns routing instructions in the form of peer identifier 506 with a label of Peer_id and a value of "Peer identifier," which designates peer A (node 104, FIG. 1). Route selector 248 returns the value of peer identifier 506 to request handler 246, which in turn submits a request to routing control 247. Routing control 247 forwards the message to the appropriate connection configured with a peer identifier of "Peer identifier" via peer connection controller 249. Peer connection controller 249 receives and forwards the message to interface 250 on the appropriate connection with a peer identifier value of "Peer identifier" to reach peer A (node 104).

Figures 7, 8:
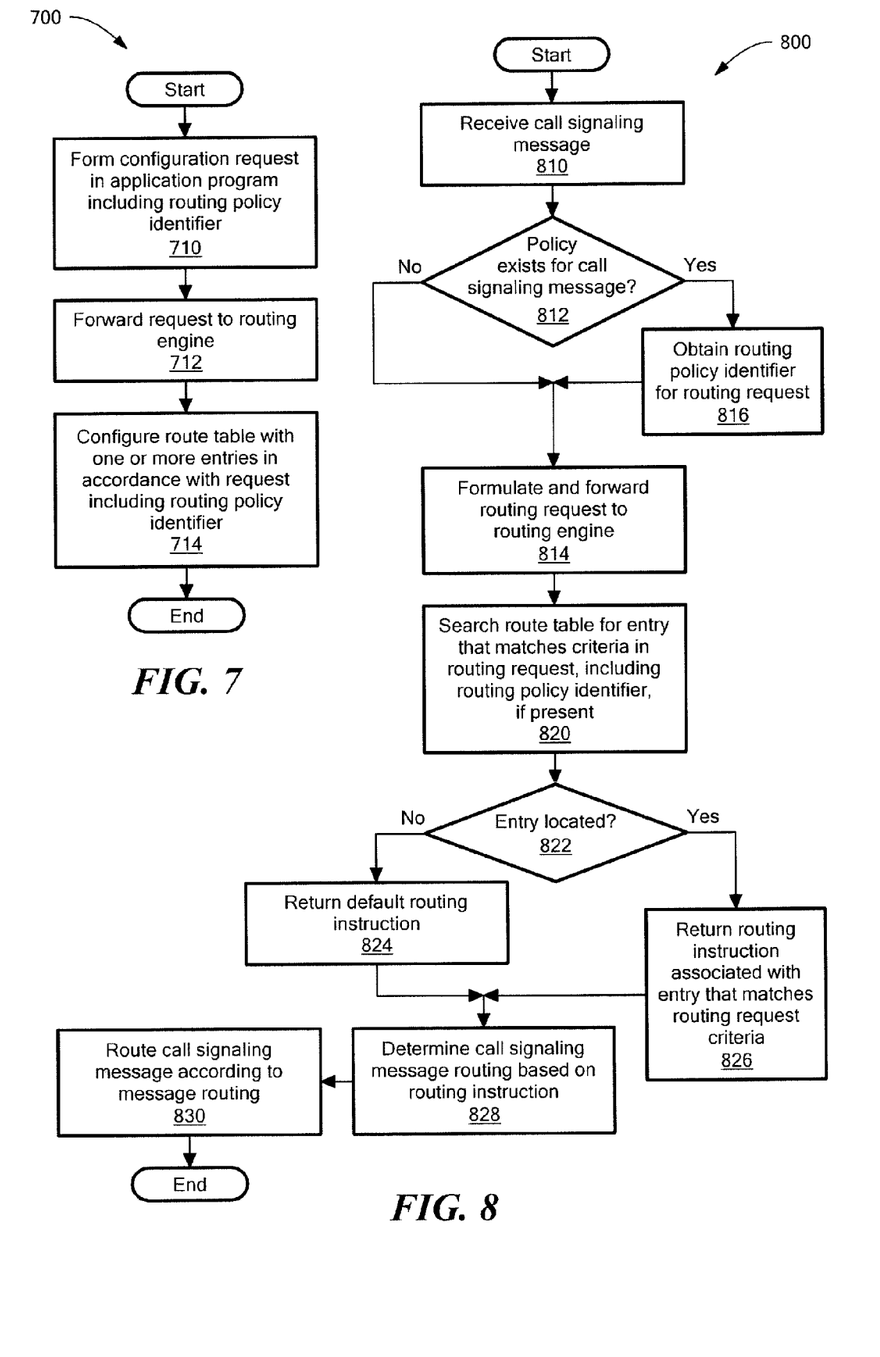
FIG. 7 is a flowchart illustrating an exemplary process for configuration of a route table entry with a routing identifier.
FIG. 8 is a flowchart illustrating an exemplary process for processing of a routing request using a routing identifier.

Referring now to FIG. 7, as well as FIG. 2b, a flowchart 700 illustrates a process for configuring route table 244 in accordance with an exemplary embodiment of the present disclosure. A block 710 illustrates the process of forming a configuration request by application program 230 to include a routing policy identifier. The configuration request is forwarded to routing engine 240, as illustrated in a block 712.

The forwarded configuration request is used to configure route table 244 with one or more entries indicated in the configuration request, as illustrated in a block 714. The one or more entries configured in route table 244 include the routing policy identifier provided in the configuration request, as is also illustrated in block 714. In accordance with the process illustrated in flowchart 700, route table 244 is configured with route entries that include the routing policy identifier used to select a specific route for customized routing of messages.

Referring now to FIG. 8, as well as FIG. 2b, a flowchart 800 illustrates a process for implementing customized routing for a message. A block 810 illustrates the receipt of the message, such as may occur by application program 230 receiving a message that is directed to and handled by request handler 236. A decision block 812 illustrates the determination being made as to whether a policy exists for the received message. The determination illustrated in decision block 812 can be made by policy engine 234 upon request by request handler 236. If a policy does exist for the message, a routing policy identifier is obtained that relates to the routing policy for the message, as illustrated with a block 816, which is reached via the "Yes" branch from decision block 812. If no policy is specifically provided to handle the received message, a routing policy identifier is not returned by policy engine 234, or a routing policy identifier that is non-specific for determining a route is returned. The lack of or a non-specific routing policy identifier being returned is illustrated with the "No" branch of decision block 812 being taken. A routing request is formed with the routing policy identifier value (or lack thereof), and the routing request is forwarded to the routing engine as illustrated in a block 814. The routing engine may be implemented as routing engine 240, which can receive the routing request from request handler 236 via interface 222.

Upon receipt of the routing request, a search of route table 244 can be initiated to locate a routing instruction that is based on or matches the routing request as illustrated in a block 820. The route table is searched to locate a routing instruction that matches criteria in the routing request, with the end result being that a matching entry is located or not located, as illustrated in a decision block 822. If an entry matching the criteria associated with the routing request is not found, a default routing instruction is returned in response to the routing request, as illustrated in a block 824 that is reached via the "No" branch of decision block 822. If a route table entry matching the criteria of the routing request is located, the routing instruction associated with that entry is returned in response to the routing request, as illustrated in a block 826. The routing instruction returned in response to the routing request may be selected based on the routing policy identifier included in the routing request, such that a customized routing instruction is provided in response to the routing request.

Upon obtaining routing instructions, message routing can be determined and implemented based at least in part on the routing instructions, as is illustrated in a block 828. The message is routed based on the routing determination as shown in a block 830 to thereby implement customized routing for a message without exposing routing operation complexities to a user application.

The operations herein described are purely exemplary and imply no particular order. Further, the operations can be used in any sequence when appropriate and can be partially used. With the above embodiments in mind, it should be understood that the in accordance with the present disclosure there can be employed various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the present disclosure are useful machine operations. The present disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of the present disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the present disclosure.

What is claimed is:

1. A system for providing routing services in a network node for use in routing a message in a telecommunication network, comprising:
   a routing engine executable in the network node,
   wherein the routing engine includes (1) a predetermined message routing protocol having one or more protocol parameters, and (2) a route table including one or more routing constructs for routing the message in the telecommunication network, and wherein at least a respective routing construct from among the one or more routing constructs includes one or more route entries, the one or more route entries including a routing policy identifier; and an application programming interface (API) implemented in the network node for providing an interface to the routing engine and the predetermined message routing protocol, the API being operative to receive a routing request from a user application program, the routing request including at least the routing policy identifier, wherein the routing engine further includes a processor communicatively coupled to a storage memory and operative to access and execute instructions stored in the storage memory:

to receive the routing request including the routing policy identifier via the API;

to identify, the respective routing construct by determining that the routing policy identifier included in the routing request corresponds to the routing policy identifier included in the one or more route entries of the respective routing construct;

to identify a respective route entry from among the one or more route entries based at least partially on the routing policy identifier, the respective route entry including (1) one or more values of the one or more protocol parameters, and (2) a routing instruction based at least partially on the one or more values of the one or more protocol parameters;

to retrieve the routing instruction included in the respective route entry; and to route the message based at least partially on the routing instruction according to the predetermined message routing protocol.

2. The system according to claim 1, wherein the routing request includes at least a portion of a content of the message.

3. The system according to claim 1, wherein the predetermined message routing protocol is effective to manage one or more of subscriber authentication, billing, and accounting information.

4. The system according to claim 1, wherein the API provides a programming interface with the user application program that is at least partially opaque with respect to routing operations performed to route the message.

5. The system according to claim 1, wherein the processor is further operative to access and execute instructions stored in the storage memory:

to receive a routing configuration request that includes the routing policy identifier; and to form the one or more route entries included in the routing construct that include the routing policy identifier.

6. The system according to claim 5, wherein the routing configuration request is received, via the API, from the user application program, and identifies a routing policy of the user application program using the routing policy identifier.

7. The system according to claim 1, further comprising:

an incoming interface operative to receive the message over the telecommunication network, the incoming interface being implemented on the network node and conforming to the predetermined message routing protocol; and an outgoing interface implemented on the network node and conforming to the predetermined message routing protocol.

8. The system according to claim 7, wherein the processor is further operative to access and execute the instructions stored in the storage memory to route the message through the outgoing interface over the telecommunication network according to the predetermined message routing protocol.

9. The system according to claim 1, wherein the API is further operative to receive a routing configuration request from the user application program.

10. The system according to claim 9, wherein the processor is further operative to access and execute the instructions stored in the storage memory to receive, at the routing engine, the routing configuration request via the API, the routing configuration request including one or more routing configuration instructions for performing one or more of (1) an addition of a further route entry to a respective routing construct included in the route table, (2) a modification of one or more of the route entry and the further route entry in the respective routing construct, and (3) a deletion of one or more of the route entry and the further route entry from the respective routing construct.

11. The system according to claim 10, wherein the processor is further operative to access and execute the instructions stored in the storage memory to access the route table including the one or more routing constructs, and to perform, in accordance with the one or more routing configuration instructions, one or more of (1) the addition of the further route entry to the respective routing construct, (2) the modification of one or more of the route entry and the further route entry in the routing construct, and (3) the deletion of one or more of the route entry and the further route entry from the routing construct, in accordance with the one or more routing configuration instructions included in the routing configuration request.

12. A computer implemented process for providing routing services in a network node for use in routing a message in a telecommunication network, comprising:

receiving, from a user application program at an application programming interface (API) implemented in the network node, a routing request that includes at least a routing policy identifier;

receiving, at a routing engine executable in the network node, the routing request including the routing policy identifier via the API, the routing engine including (1) a predetermined message routing protocol having one or more protocol parameters, and (2) a route table including one or more routing constructs for routing the message in the telecommunication network, at least a respective routing construct from among the one or more routing constructs including one or more route entries, the one or more route entries including the routing policy identifier, the API providing an interface to the routing engine and the predetermined message routing protocol;

identifying, by the routing engine, the respective routing construct by determining that the routing policy identifier included in the routing request corresponds to the routing policy identifier included in the one or more route entries of the respective routing construct;

identifying, by the routing engine, a respective route entry from among the one or more route entries based at least partially on the routing policy identifier, the respective route entry including (1) one or more values of the one or more protocol parameters, and (2) a routing instruction based at least partially on the one or more values of the one or more protocol parameters;

retrieving, by the routing engine, the routing instruction included in the respective route entry; and routing, by the routing engine, the message based at least partially on the routing instruction according to the predetermined message routing protocol.

13. The method according to claim 12, further comprising: including at least a portion of a content of the message in the routing request.

14. The method according to claim 12, further comprising: receiving the routing request from the user application program via the API, the routing request identifying a routing policy using the routing policy identifier.

15. The method according to claim 12, wherein the predetermined message routing protocol is effective to manage one or more of subscriber authentication, billing, and accounting information.

16. The method according to claim 12, further comprising: providing the API as a programming interface with the user application program that is at least partially opaque with respect to routing operations performed to route the message.

17. The method according to claim 12, further comprising: receiving a routing configuration request that includes the routing policy identifier; and
forming the one or more route entries included in the routing construct that include the routing policy identifier.

18. The method according to claim 17, further comprising: receiving, at the routing engine, the routing configuration request from the user application program via the API, the routing configuration request identifying a routing policy of the user application program using the routing policy identifier.

19. A computer implemented process for providing routing services in a network node for use in routing a message in a telecommunication network, comprising:
exposing an application programming interface (API) to a user application program to receive a request related to routing the message in the telecommunication network, the request including at least an identifier that identifies a policy implemented in the user application program;
receiving the request including the identifier at a routing engine via the API, the routing engine including (1) a predetermined message routing protocol having one or more protocol parameters, and (2) a route table including one or more routing constructs for routing the message, at least a respective routing construct from among the one or more routing constructs including one or more route entries, the one or more route entries including the identifier, the API providing an interface to the routing engine and the predetermined message routing protocol;
identifying, by the routing engine the respective routing construct by determining that the identifier included in the routing request corresponds to the identifier included in the one or more route entries of the respective routing construct;
identifying, by the routing engine, a respective route entry from among the one or more route entries based at least partially on the identifier, the respective route entry including (1) one or more values of the one or more protocol parameters, and (2) a routing instruction based at least partially on the one or more values of the one or more protocol parameters;
retrieving, by the routing engine, the routing instruction included in the respective route entry; and
routing, by the routing engine, the message based at least partially on the routing instruction according to the predetermined message routing protocol.

20. A system for providing routing services in a network node for use in routing a message in a telecommunication network, comprising:
a routing engine executable in the network node, the routing engine including (1) a predetermined message routing protocol having one or more protocol parameters, and (2) a route table including one or more route entries for routing the message in the telecommunication network, the one or more route entries including a routing policy identifier; and
an application programming interface (API) implemented in the network node for providing an interface to the routing engine and the predetermined message routing protocol, the API being operative to receive a routing request from a user application program, the routing request including at least the routing policy identifier,
wherein the routing engine is operative:
to receive the routing request including the routing policy identifier via the API;
to identify a respective route entry in the route table from among the one or more route entries by determining that the routing policy identifier included in the routing request corresponds to the routing policy identifier included in the one or more route entries of the route table, the respective route entry including (1) one or more values of the one or more protocol parameters, and (2) a routing instruction based at least partially on the one or more values of the one or more protocol parameters;
to retrieve the routing instruction included in the respective route entry; and
to route the message based at least partially on the routing instruction according to the predetermined message routing protocol.

21. The system according to claim 20, wherein the API is further operative to receive a routing configuration request from the user application program, the routing configuration request including one or more routing configuration instructions for performing one or more of (1) an addition of a further route entry to the route table, (2) a modification of one or more of the route entry and the further route entry in the route table, and (3) a deletion of one or more of the route entry and the further route entry from the route table.

22. The system according to claim 21, wherein the routing engine is further operative:
to receive the routing configuration request including the one or more routing configuration instructions via the API; and
to perform one or more of (1) the addition of the further route entry to the route table, (2) the modification of one or more of the route entry and the further route entry in the route table, and (3) the deletion of one or more of the route entry and the further route entry from the route table, in accordance with the one or more routing configuration instructions included in the routing configuration request.

* * * * *